United States Patent [19]
Vanderhoof et al.

[11] 3,735,867
[45] May 29, 1973

[54] ARTICLE CONVEYOR WITH LATERAL SWITCHING MECHANISM

[75] Inventors: Frank B. Vanderhoof, Lake Forest; Robert Dederer, Boonton Township, Morris County, both of N.J.

[73] Assignee: Metramatic Corp., Landing, N.J.

[22] Filed: July 21, 1972

[21] Appl. No.: 273,938

[52] U.S. Cl. ............... 209/74 R, 209/82, 198/31 AB
[51] Int. Cl. ..................................... B07c, B41j 7/30
[58] Field of Search ..................... 209/73, 74 R, 90, 209/121; 198/31 R, 31 AA, 31 AB, 31 AC

[56] References Cited
UNITED STATES PATENTS

| | | | |
|---|---|---|---|
| 3,580,379 | 5/1971 | Shuster | 198/31 AA |
| 3,190,432 | 6/1965 | Vanderhoof | 209/121 X |
| 3,511,357 | 5/1970 | Vanderhoof | 198/31 AB |
| 3,009,572 | 11/1961 | Seaborn | 198/31 AC |
| 3,093,245 | 6/1963 | Worcester et al. | 209/121 |
| 3,129,803 | 4/1964 | Giulie et al. | 198/31 AC |
| 3,277,995 | 10/1966 | Seed | 198/31 R |

*Primary Examiner*—Allen N. Knowles
*Attorney*—Albert F. Kronman

[57] ABSTRACT

A conveyor having a plurality of plate-like article carriers for supporting a series of articles or article containers. A scanning means detects specific containers and diverts them to one side of the conveyor where they may be picked up by a second conveyor and removed to a storage position. A lateral extension of each plate-like carrier permits the movement of the articles across the conveyor and onto a second conveyor.

7 Claims, 5 Drawing Figures

PATENTED MAY 29 1973

ARTICLE CONVEYOR WITH LATERAL SWITCHING MECHANISM

BACKGROUND OF THE INVENTION

This invention is an improvement on the conveyor described in U.S. Pat. No. 3,511,357, issued May 12, 1970 to the same assignee as this application. U.S. Pat. No. 3,511,357 is incorporated herein by reference.

Prior art conveyor separating devices such as those shown in U.S. Pat. No. 3,511,357 move boxes or articles into three or more parallel rows on the conveyor belt and these rows of articles are available only at the end of the conveyor belt. Rarely more than fine rows can be accomodated by such a device and when the articles are large and heavy, the power and space requirements are undesirable.

The present invention makes it possible to employ a plurality of relatively small conveyors to separate the articles into a large number of paths, the various classes of articles being delivered to the side of a series of small conveyors instead of the end of a single large conveyor. Additional conveyors may be added to the array resulting in a multiple sorting action, the resulting number of classes being limited only by the number of conveyors in the line.

One of the features of the present invention includes a plurality of plate-like article supports slidably secured to rods on the conveyor. The supports carry the articles along the conveyor and are directed thereacross to deliver the articles to a desired switching position.

Another feature of the invention includes an extended portion of the article support which when moved laterally, can assume a position extending over the edge of the conveyor and deliver articles to an adjoining belt or conveyor. Such a transfer can be made smoothly and without a severe shaking of the articles.

Another feature of the invention includes a series of carrier directing cams positioned below the plane of the moving rods and article supports. The cams cooperate with cam follower pins secured to the bottom of the supports to move the supports laterally along the rods.

Other features and additional details of the invention will be disclosed in the following description, taken in connection with the accompanying drawings.

DESCRIPTION OF THE PREFERRED EMBODIMENT

Figure 1:
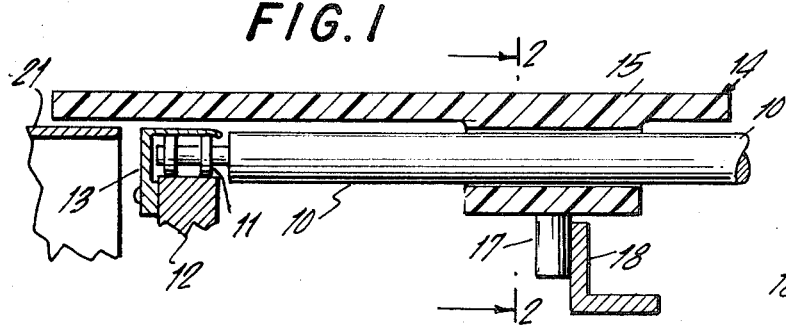
FIG. 1 is a fragmentary cross sectional view of an article carrier support showing its follower pin in contact with a cam.
Figure 2:
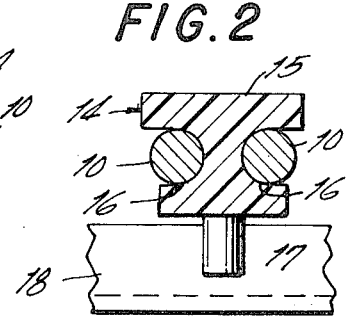
FIG. 2 is a cross sectional view of the carrier support shown in FIG. 1 and is taken along line 2—2 of that figure.

Referring now to the figures, there is shown an article conveyor 9 having a plurality of rods 10 journaled between two chains 11 (one of which is shown in FIG. 1). The chains 11 are generally supported on rails 12 and are protected by a guard angle 13. At the ends of the conveyor 9 a sprocket wheel 8 driven by a source of rotary power (not shown) receives the chain links and drives the chains 11 along the rails 12. A suitable sprocket wheel drive is shown and described in the above mentioned U.S. Pat. No. 3,511,357. The rods 10 are grouped in pairs and each pair supports a single plate-like article carrier 14, shown in detail in FIGS. 1 and 2. The carrier 14 has a flat upper plate-like surface 15 for supporting articles and carrying them along the length of the conveyor. The body 14A of the carrier 14 is formed with two opposed hemi-cylindrical horizontal grooves 16 to freely receive two rods therebetween. A cam follower pin 17 is secured to the bottom of the carrier body 14A and is engaged by a series of elongated cams 18. The cams 18 thus guide the carriers 14 along the rods to selected positions as the rods 10 are driven by the sprocket wheels.

Figure 3:
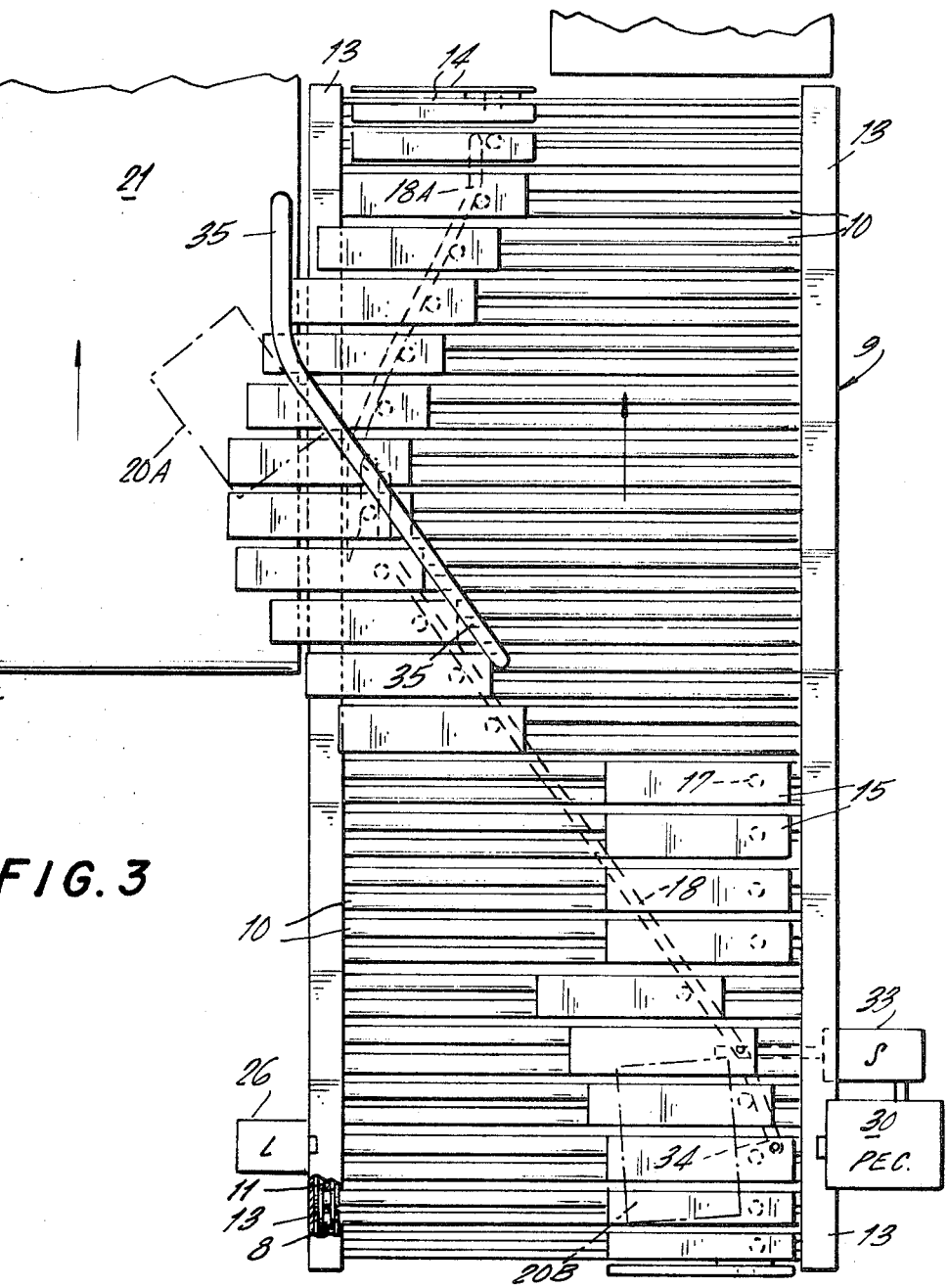
FIG. 3 is a plan view on a reduced scale of a conveyor showing some of the carrier supports moved to one side to deliver an article laterally to an adjoining belt.

FIG. 3 shows the position of a first cam 18 which engages the cam follower pins 17 near the right side of the conveyor 9 and moves the pins and the carriers to the left to a position where the left side of the carrier plates 14 extend over the chain and guard angle 13 so that an article 20A may be transferred to a moving belt or second conveyor 21. The belt or conveyor 21 may move in the direction indicated by the arrow or it may be mounted to carry the articles away from the main conveyor at an angle such as 90° from the main conveyor direction. The belt or conveyor 21 may be run by a motor 19 (see FIG. 4) under the belt and coupled to a first pulley 22. A belt 23 over this puller is coupled to a second pulley 24, connected to the belt drain 25.

Figure 4:
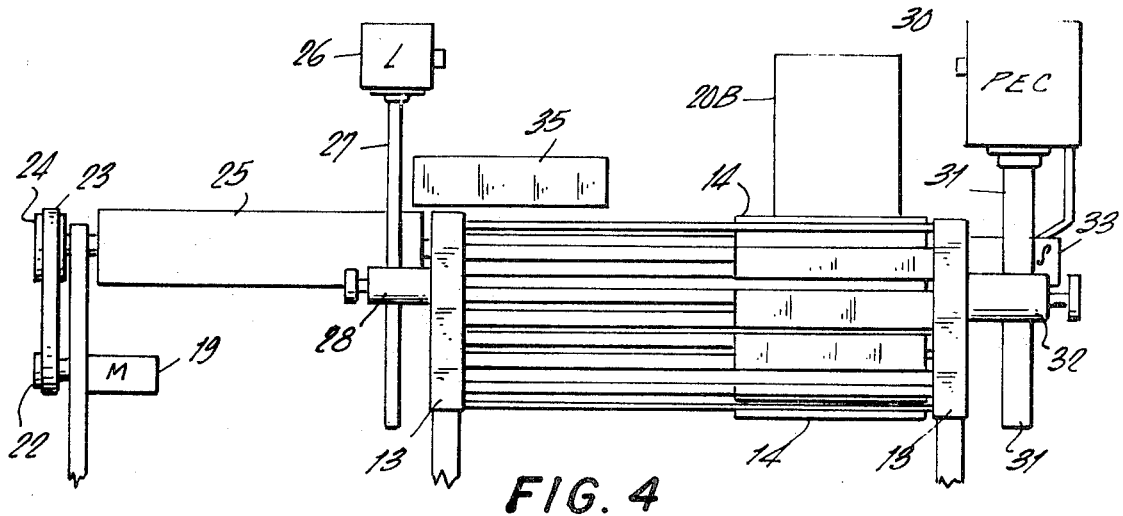
FIG. 4 is an end view of the conveyor showing one type of article separation device.

The separation of articles into two classes or groups may be made with ragard to their weight, their size, or their color. In FIGS. 3 and 4, the selection is made in regard to height of the packaged articles. For this purpose, a source of light 26 is mounted on a vertical rod 27 held by a clamp 28. On the other side of the conveyor a photosensitive transducer 30, such as a photoelectric cell, is mounted on a rod 31 and held in place by a clamp 32. When light from lamp 26 is received by transducer 30, no electrical impulse is sent to a solenoid 33 and the carriers 14 move straight ahead without deviation. When an article such as a box 20B cuts off the light from the transducer 30, the circuits send a pulse to the solenoid 33 and a swingable cam 34 (FIG. 3) is moved to the position shown in the drawing. This action engages the cam follower pins on the carriers and moves them to the left where the elongated cam 18 engages the follower pins and moves the carriers 14 laterally across the conveyor to the position shown, where the plate-like portions 15 of the carriers extend over the left edge of the conveyor 9 and above the second conveyor belt 21. In this position an article 20A (shown in dashed lines) on the carriers 14 may be dislodged by a guide 35 mounted above the carrier plates 15. An article 20A will then be transferred from the first conveyor 9 and dsposited on endless belt 21. The transfer is achieved with a minumum of shaking and can even handle unsealed liquid filled containers.

After the carriers 14 have given up their articles the cam follower pins are engaged by a third elongated cam 18A and moved back to a position where the entire upper plate-like surface of the carrier 14 is between the two guard angles 13. The carriers are thereafter carried to the underside portion of conveyor 9 and another cam (not shown) moves all the carriers back to their original position as shown in FIG. 4.

Figure 5:
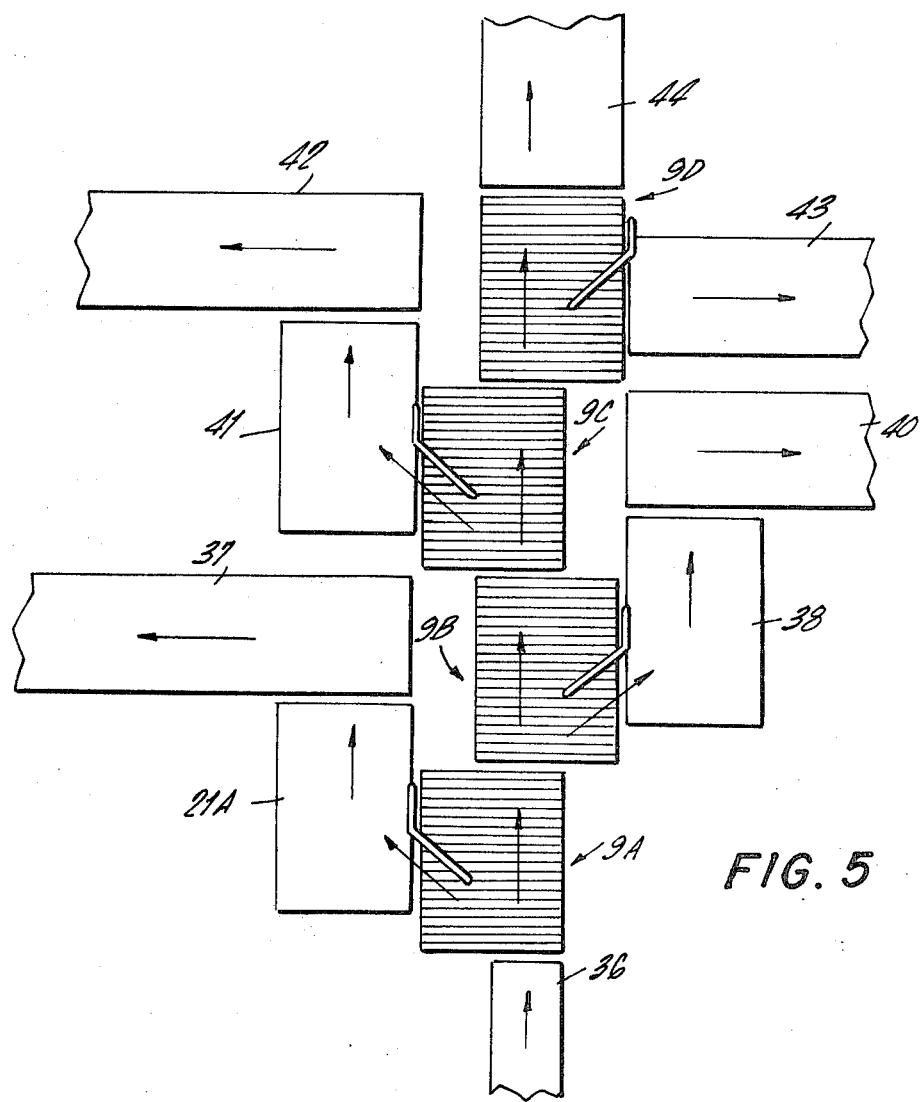
FIG. 5 is a plan view of four conveyors made in accordance with the present invention arranged to separate articles into five paths.

The arrangement of conveyors shown in FIG. 5 illustrates how several switching conveyors can be used to switch an initial line of articles into five or more groups. The articles are delivered to the first switching conveyor 9A by a belt conveyor 36. Some of the articles are diverted to belt 21A in the manner described above and then transferred to belt 37. The undiverted articles are moved straight ahead to a second switching conveyor 9B where a second switching action takes place. The selected articles are moved to the right of conveyor 9B and diverted to moving belts 38 and 40. The remaining articles again move straight through to a third conveyor 9C where a similar switching action takes place.

Diverted articles are moved to the left on conveyor 9C to endless blets 41 and 42 while the remaining articles move, as before, straight to the last conveyor 9D where the last switching action takes place. The diverted articles are deposited on an endless belt 43 while the remaining articles move to belt 44. The diverting mechanism has not been shown in FIG. 5 for the sake of clarity.

From the above description it will be obvious that this type of switching conveyor can accomodate large boxes and divert predetermined groups or classes to positions adjoining the lateral edges of the conveyors rather than to the conveyor end. It is more flexible and can be adapted to many types of switching arrangements.

Having thus fully described the invention, what is claimed as new and desired to be secured by Letters Patent of the United States, is:

1. An article conveyor for detecting and directing one or more of a plurality of articles along a path lateral to the said conveyor comprising:
    a. an article transporting member;
    b. a plurality of article receiving transverse rods carried by the transporting member;
    c. spaced enders chains to receive the ends of said rods therebetween;
    d. means including sprocket wheels and a source of power connected to the chains to move the rods longitudinally within the conveyor;
    e. a plurality of article carriers carried by the rods and laterally slidable thereon, each of said carriers including a plate-like article support and a downwardly extending cam follower;
    f. a first elongated cam, said cam follower positioned relative to said support to enable the first elongated cam to engage the cam followers and divert the article carriers from their longitudinal path to a lateral position wherein a portion of the plate-like support extends outwardly of the side of the conveyor;
    g. means to move the cam followers into contact with the first cam, and
    h. means including a second elongated cam to return the article carriers to their original position on the conveyor rods.

2. An article conveyor according to claim 1, in which the means to move the cam follower into contact with the first elongated cam is a swingable cam.

3. An article conveyor according to claim 2 in which the swingable cam is moved from an open position wherein the cam followers are not moved into contact with the first elongated cam, to a closed position by a solenoid.

4. A conveyor according to claim 3 wherein the solenoid is operated by an electric circuit controlled by a sensing means which is responsive to a characteristic of the articles delivered to the the unit 5. A conveyor according to claim 4 wherein the articles delivered to the conveyor are sensed with regard to their height, the sensing equipment including a source of light at one side of the conveyor and a photosensitive element at the other side, the photosensitive element being coupled to the solenoid.

6. A conveyor according to claim 1 wherein a deflecting guide is positioned at the lateral delivery position for moving the diverted articles off the supports.

7. A conveyor according to claim 6 wherein a second conveyor is positioned adjoining the delivery position to receive and remove the diverted articles.

* * * * *